Nov. 14, 1944. J. RODWAY 2,362,931
MEANS FOR CONTROLLING BRAKES ON TRAILER VEHICLES
Filed Jan. 6, 1943. 3 Sheets-Sheet 1
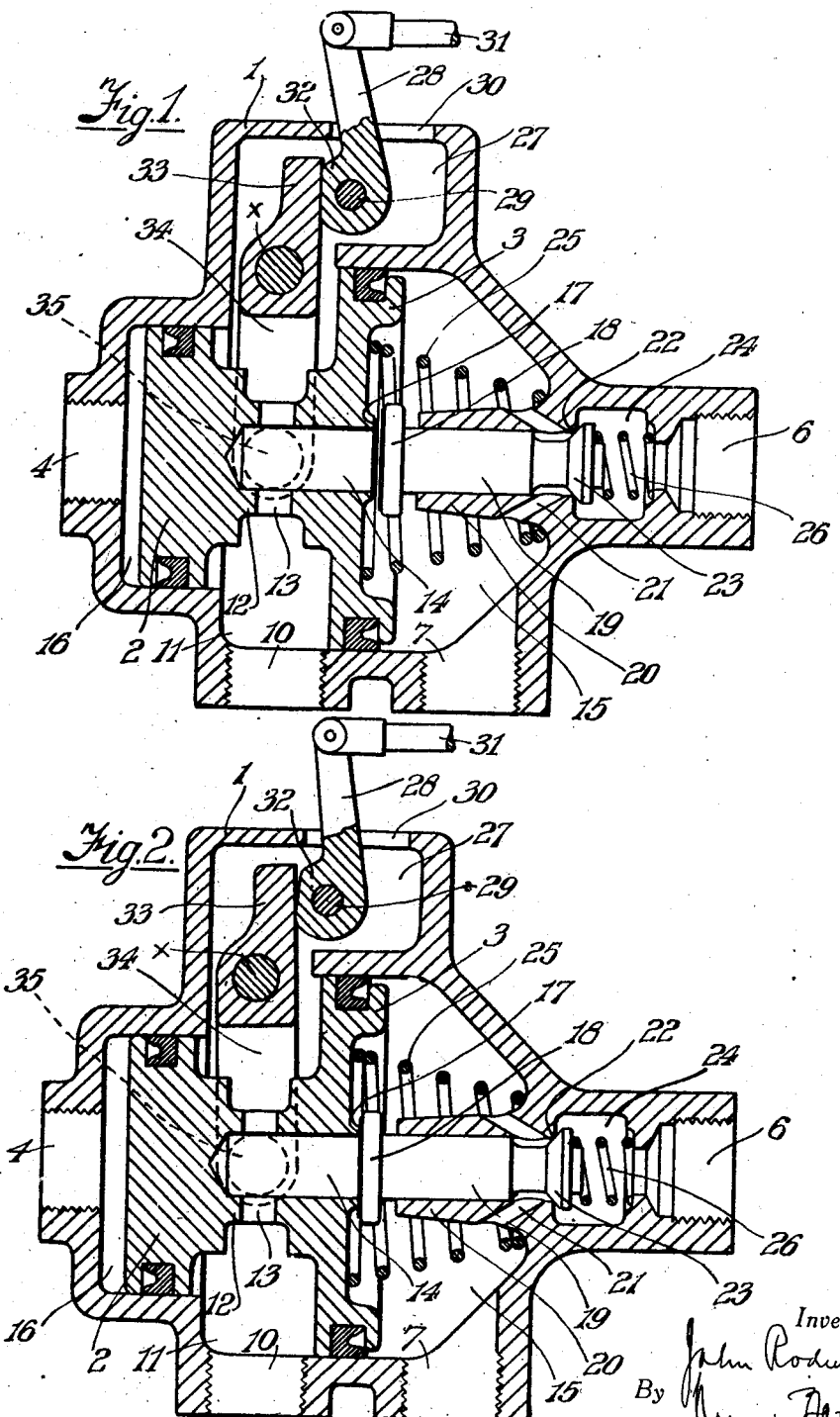

Nov. 14, 1944.　　　J. RODWAY　　　2,362,931
MEANS FOR CONTROLLING BRAKES ON TRAILER VEHICLES
Filed Jan. 6, 1943　　　3 Sheets-Sheet 2

Inventor
John Rodway
By
Attorneys

Patented Nov. 14, 1944

2,362,931

UNITED STATES PATENT OFFICE 2,362,931

MEANS FOR CONTROLLING BRAKES ON TRAILER VEHICLES

John Rodway, Lincoln, England

Application January 6, 1943, Serial No. 471,483
In Great Britain February 17, 1942

5 Claims. (Cl. 188—3)

This invention relates to means for controlling the brakes on trailer vehicles and to the kind wherein the effort applied through fluid pressure assisted servo brake devices on a tractor vehicle is transmitted also to the brake operating mechanism of a trailer vehicle.

The invention has particular reference to control devices which operate to transmit a lesser braking effort when the trailer is unladen than when it is loaded, and it is the object of the invention to provide an improved control device for this purpose which is of simple and robust construction and which is particularly adapted for use in the direct or single acting air pressure systems used on heavy motor vehicles.

According to the invention there is provided a control device comprising a valve housing connected to a source of fluid pressure on the tractor vehicle and to the trailer brake actuating means, and a pair of connected pistons or diaphragms of differential areas mounted within said housing and controlling the operation of valve elements in such manner that, when the trailer is unladen, a pressure is transmitted to the trailer brake actuating means which is a predetermined proportion of the pressure available in the main or service line, wherein the whole of the movable valve components are carried by or directly actuated by the piston or diaphragm assembly, hand operated means being provided, adapted to be used when the trailer is loaded, for moving said assembly to and holding it in a position in which the valves are set to allow the whole of the pressure available in the service line to be transmitted to the trailer brake actuating means.

Figure 3:
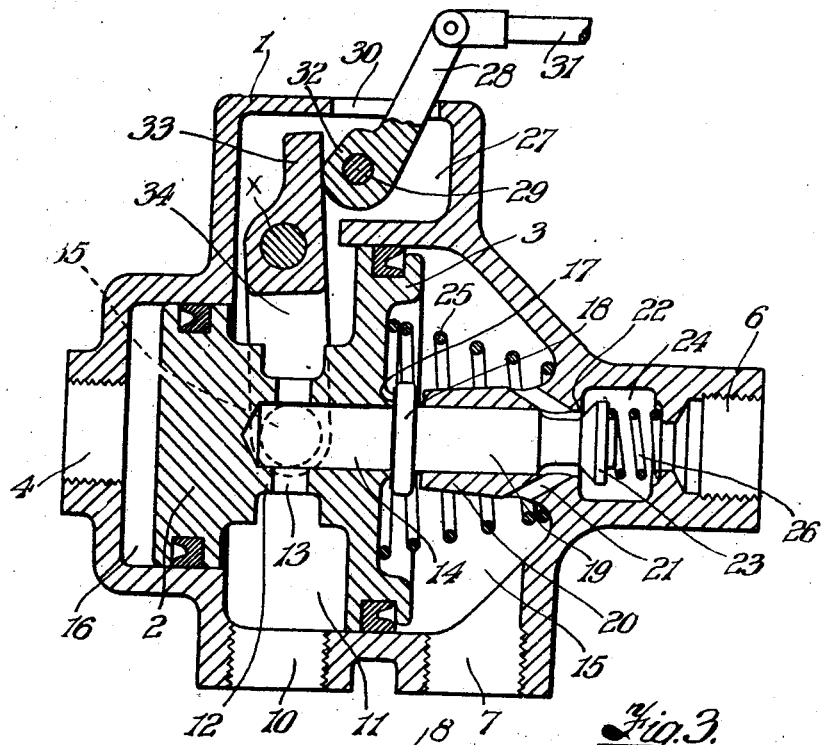
Figure 4:
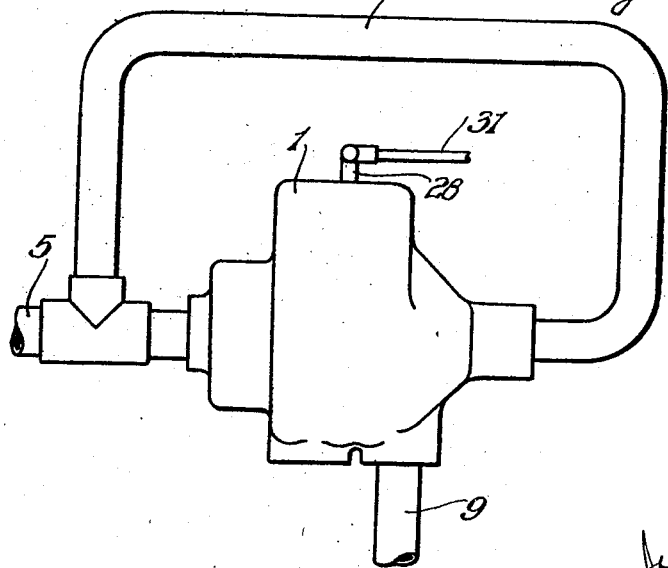
Figure 5:
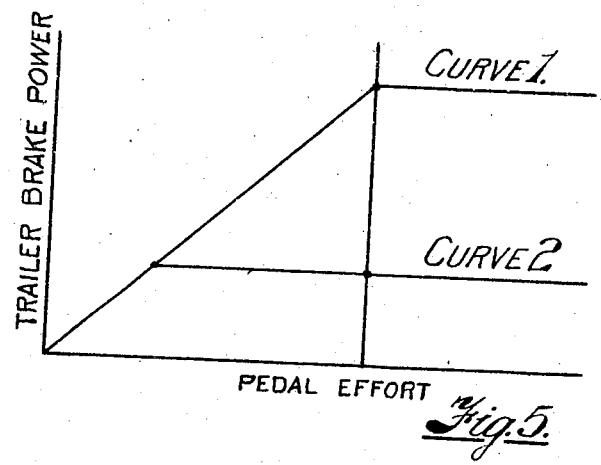
Figure 6:
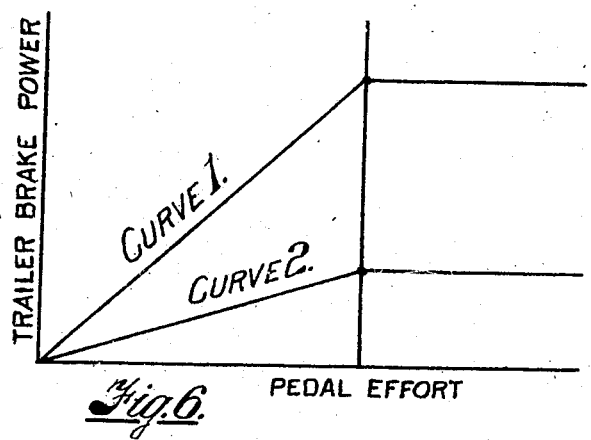

Reference will now be made to the accompanying drawings which illustrate a construction according to the invention and in which:

Fig. 1 is a sectional elevation of a control valve for trailer brake mechanism with the parts in the brakes "off" position when the trailer vehicle is unladen, Fig. 2 is a sectional elevation similar to Fig. 1, but showing the operative position of the parts when the trailer vehicle is unladen, Fig. 3 is a sectional elevation showing the operative position of the parts when the trailer vehicle is loaded, Fig. 4 is an external elevation showing the control connections, Fig. 5 is a diagram showing the relations between pedal effort and trailer brake power under conditions hitherto prevailing and Fig. 6 is a diagram to illustrate the relation between pedal effort and trailer brake power when the control according to the invention is used.

In the construction illustrated and referring first to Fig. 1, a casing 1 contains two pistons 2 and 3 of differential areas the ratio between which is determined by the ratio between the light and loaded weights of the trailer vehicle to which the invention is applied.

The casing 1 has a port 4 adapted to communicate with a source of fluid pressure on the tractor vehicle, the connection to which is shown at 5 in Fig. 4. The casing 1 has also ports 6 and 7, the port 6 also communicating with the conduit 5 by way of a pipe 8 and the port 7 communicating with the trailer brake cylinders by way of a conduit 9 shown in Fig. 4. The casing is further provided with a fourth port 10 through which a chamber 11 within the casing 1 communicates with atmosphere and which serves as an exhaust port. The two pistons 2 and 3 are connected at their central portions by a stem 12 having ports 13 therein communicating with a central passage 14 within the stem opening into a chamber 15 within the casing 1.

The smaller piston 2 is mounted in a compartment 16 of the casing. Around the open end of the passage 14 is formed a valve seating 17 with which co-operates a valve member 18 carried at one end of a rod 19 movably mounted in a guide sleeve 20 forming part of the casing 1 and formed near its outer end with ports 21 and a valve seating 22. The outer end of the rod 19 carries a valve member 23 adapted to co-operate with the seating 22, the said valve member 23 being movable in a chamber 24 which is in permanent communication with the pressure fluid inlet port 6.

The larger piston 3 is normally prevented from movement which would bring the valve seating 17 into contact with the valve member 18 by a spring 25 one end of which bears against the piston and the other end of which surrounds the sleeve 20 and bears against the recess formed between the sleeve and the casing wall. A second spring 26 is disposed within the chamber 24 and tends to maintain the valve member 23 on its seat 22.

Within an extension 27 of the central chamber 11 is mounted an adjusting lever 28 pivotally mounted at 29 and projecting through a slot 30 in the casing wall, its outer portion being connected by a rod or cable 31 to a manual or pedal operating device. The lever 28 carries a cam 32 which bears against one end 33 of a U-shaped arm 34 pivoted at $x$ and which embraces and is pivotally connected to the stem 12 at 35.

The operation of the device above described is as follows:

Fig. 1 shows the parts in the positions which they occupy when the brakes are in the "off" position, the valve 23 being closed and the chambers 11 and 15 being open to atmosphere by way of passage 14, ports 13 and the port 10. When the brakes are to be applied and the trailer vehicle is unladen, a pressure fluid control valve on the tractor vehicle is operated so that pressure is applied simultaneously to the ports 4 and 6. The pressure acting on piston 2 causes the valve seat 17 to move into contact with valve member 18 and lift valve 23 off its seat to admit pressure fluid through ports 21 to chamber 15 until the pressure load on the piston 3 is equal to the pressure load on piston 2. When this point is reached the pistons 2, 3 move slightly to the left followed by the valve rod 19 until both valve members 23 and 18 contact with their seats 22 and 17 respectively as shown in Fig. 2, and the elements will remain in these positions until the pressure operating through port 4 is varied. Under these conditions, the pressure in chambers 15 and 16 will be in the inverse proportion of the ratio of the effective areas of the pistons 2 and 3. By the operations above described the pressure after operating over a short time through the port 6 is cut off by the seating of valve member 23 with the result that less braking effort is utilised for the actuation of the brakes than would be the case if free and unrestricted pressure operated through the port 7 and conduit 9. When the pressure control valve on the tractor is returned to release position and the service line is vented to atmosphere, the pressure in ports 4 and 6 is destroyed thus allowing the pressure in chamber 15 to push the piston 3 and seating 17 away from the valve 18 so that pressure fluid can escape through passage 14, ports 13, chamber 11 and port 10 to atmosphere. The parts are thereby returned to the positions shown in Fig. 1 with corresponding release of the brake effort.

When the trailer vehicle is loaded, the hand control lever 28 is moved towards the right to the position shown in Fig. 3, thereby drawing both pistons 2 and 3 towards the right, seating valve 18 and opening valve 23. Thus, direct communication is established between ports 6 and 7 so that the pressure applied through conduits 5 and 8 is passed on to the trailer brake applying mechanism undiminished in degree.

Referring now to Fig. 5, curve 1 shows the relation between pedal effort and trailer brake power on a trailer vehicle operating under normal conditions using a simple reduction valve in the connections between tractor and trailer vehicles. Curve 1 in Fig. 5 represents conditions when the trailer is loaded, but when the reduction valve is in operation and the trailer is unloaded curve 2 is produced.

Fig. 6 illustrates similar curves obtained by using the valve according to the present invention, curve 1 corresponding to the loaded condition of the trailer vehicle and curve 2 corresponding to the unloaded condition. By comparing Figs. 5 and 6 it will be seen that whereas the total braking in the unladen condition in Fig. 5 can be the same as that in Fig. 6 yet the pedal effort range corresponding to maximum braking when unladen is very much greater when the present invention is used. This represents a considerable improvement in controllability of the unladen vehicle.

It is to be understood that although the invention has been described with particular reference to the use of a pair of pistons 2 and 3 these could be replaced by connected diaphragms having their peripheral portions fixed to the walls of the casing 1 but capable of flexing at their central portions to move the seating 17 towards and away from the valve member 18.

I claim:

1. A device for controlling the brakes of a trailer vehicle, comprising a valve housing, means for connecting said valve housing to a source of pressure on a tractor vehicle and to trailer brake applying means respectively, a pair of pistons of differential areas mounted in said housing and having a connection between the central portions thereof, a spring actuated valve member, a seat for said valve member on one of said pistons and communicating with the atmosphere, a fixed seat for said valve member in said housing and communicating with the brake applying means, and manual means operable on said pistons and valve member to cause application of the brakes when the trailer vehicle is loaded.

2. A device for controlling the brakes of a trailer vehicle, comprising a valve housing, a pair of pistons of differential areas mounted in said housing and enclosing between them a space continually open to atmosphere, a central connection between said pistons, a disc valve member movably mounted adjacent one of said pistons, a seat for said valve member on one of said pistons and communicating with said space between the pistons, means for connecting both ends of said housing to a source of pressure fluid on a tractor vehicle, a second seat for said valve member fixed in the end of the housing adjacent the piston of larger area for controlling the admission of pressure fluid thereto, means for connecting the end of said housing adjacent the piston of larger area to the trailer brake mechanism, and manual means operable on said pistons and valve member to place the connection to said brake mechanism in free communication with said source of pressure fluid when the trailer vehicle is loaded.

3. A device for controlling the brakes of a trailer vehicle, comprising a valve housing, a pair of pistons of differential areas mounted in said housing, a rigid connection between said pistons, valve components mounted coaxially with said connection, means for applying pressure to both ends of said housing, a port in said housing adjacent the piston of larger area and communicating with the trailer vehicle brakes, and manual means operable upon said pistons and valve components to admit full pressure to the trailer vehicle when the trailer vehicle is loaded.

4. A device for controlling the brakes of a trailer vehicle, comprising a valve housing, a pair of pistons of differential areas mounted in said housing and enclosing between them a space in constant communication with atmosphere, a valve component mounted centrally of said pistons, a spring opposing movement of said valve component in one direction, an annular valve seat formed on one of said pistons and communicating with said space, a second valve seat formed in an end wall of said housing, said valve seats cooperating with said valve component, means for connecting both ends of said housing to a source of pressure fluid on a tractor vehicle, means for connecting the end of said housing adjacent the piston of larger area and having said second valve seat therein to the trailer brakes, and hand operable means to move said pistons and valve component to a position to admit full pressure to the trailer brakes when the vehicle is loaded.

5. A device for controlling the brakes of a trailer vehicle, comprising a valve housing having means for connecting it to a source of pressure fluid on a tractor vehicle and to the brake applying means of the trailer, a fluid pressure responsive member mounted movably in the housing and having differential areas, the smaller area of said member being in direct communication with the means for connecting the housing to said source of pressure fluid and the larger area of said member being in communication with the means for connecting the housing to said brake applying means, said member having a passage communicating with the atmosphere and a valve seat for controlling said passage, a valve element having a component cooperative with said valve seat to control said passage and having a second component, a relatively fixed valve seat cooperative with said second valve component and controlling communication between the means for connecting the housing to said source of pressure fluid and said larger piston area and brake applying means, and manually operable means for moving said fluid pressure responsive member into a position to engage the valve seat thereon with the cooperative valve component to close said passage and to move said second valve component into open position relatively to said fixed valve seat.

JOHN RODWAY.